United States Patent [19]

Sturgill

[11] 4,219,094
[45] Aug. 26, 1980

[54] STRADDLE CRANE APPARATUS

[75] Inventor: James D. Sturgill, Roxboro, N.C.

[73] Assignee: RPC Corporation, Roxboro, N.C.

[21] Appl. No.: 959,071

[22] Filed: Nov. 9, 1978

[51] Int. Cl.$^2$ ............................ B60P 1/02; B66C 5/02
[52] U.S. Cl. .................................... 180/236; 29/469;
52/729; 52/731; 180/242; 180/253; 403/262;
414/460
[58] Field of Search ................................ 414/459–461;
212/13–16, 140, 141; 296/187; 52/283, 263,
720, 729, 731; 403/262, 336, 337; 29/468, 469;
180/236, 242, 253

[56] References Cited

U.S. PATENT DOCUMENTS

| | | | |
|---|---|---|---|
| 3,251,433 | 5/1966 | Hintze et al. | 180/152 |
| 3,356,239 | 12/1967 | Klein | 414/460 |
| 3,640,413 | 2/1972 | Klein | 414/461 |
| 4,054,392 | 10/1977 | Oppenheim | 403/262 X |

*Primary Examiner*—Robert G. Sheridan
*Attorney, Agent, or Firm*—John H. Mulholland

[57] ABSTRACT

A straddle crane including four vertical column members, two side beam or torsion members, and at least one header beam member, and having wheel or caster assemblies supporting each vertical column member. The straddle crane is implemented for two-wheel or four-wheel steering and for two-wheel or four-wheel driving with open or closed ends. The structures of the header beam and the side beam members are appropriately selected, and the attachment means therefor to the vertical column members are chosen to accommodate the various forces and stresses occurring on the structure during normal operation over uneven terrain or surfaces. The header beam member is sufficiently flexible to permit movement of the casters over and in contact with uneven terrain without producing unacceptable shear stresses in the header beam member. The torsion beam member defines a closed geometric figure in cross section to provide torsional and bending resistance to the loads applied to the vertical columns.

34 Claims, 18 Drawing Figures

(2-WHEEL STEER)
(2-WHEEL DRIVE)

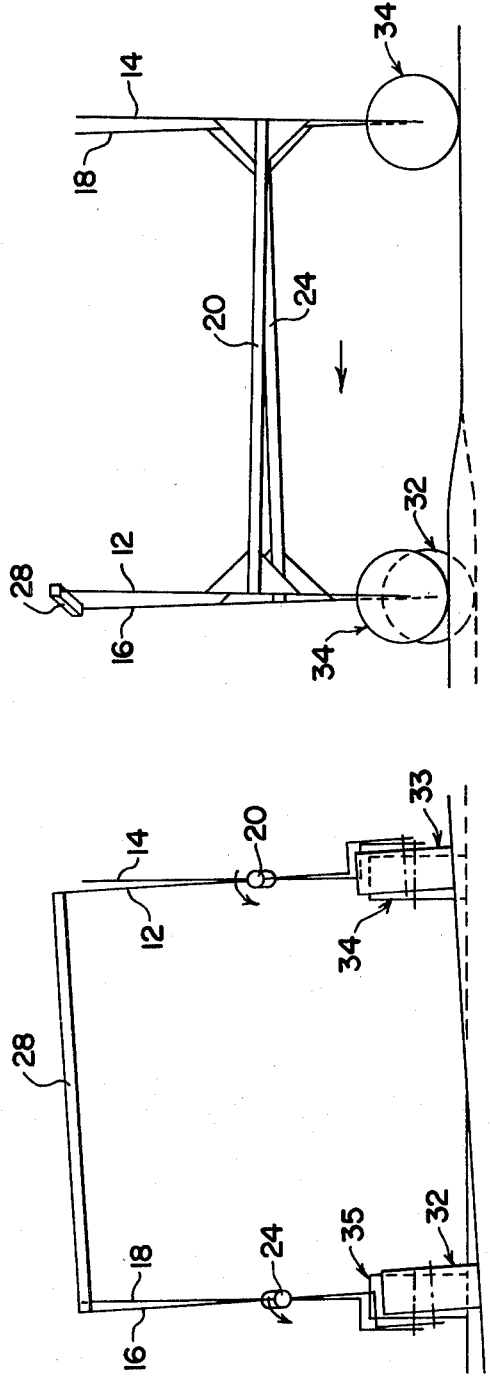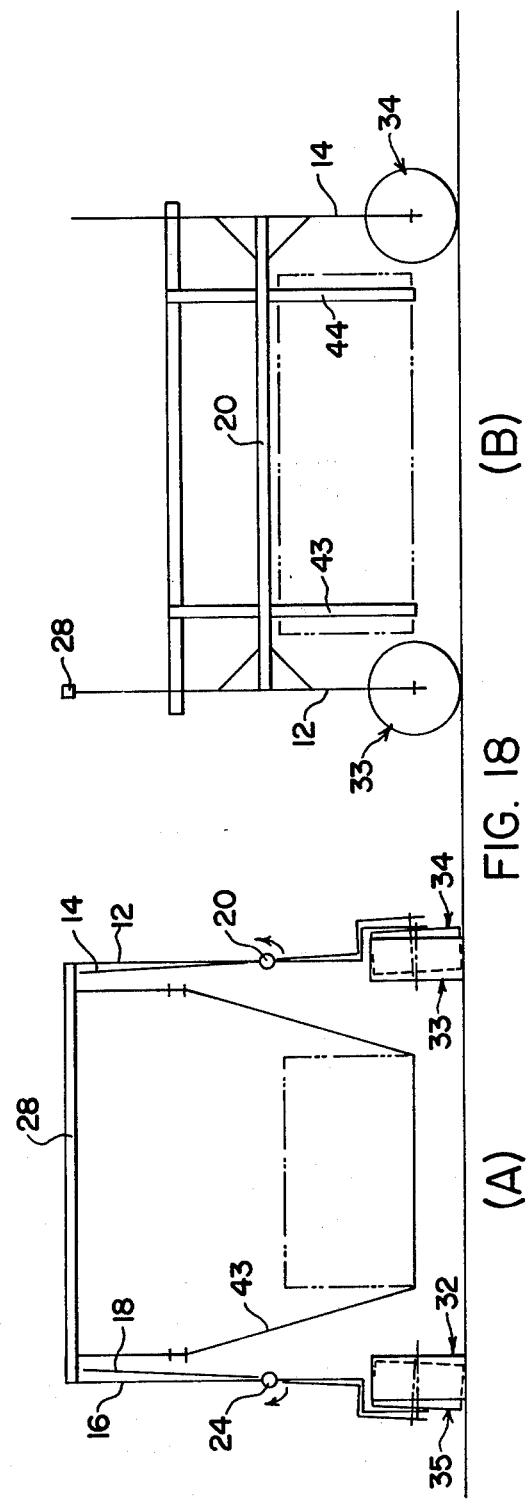
FIG. 17
FIG. 18

STRADDLE CRANE APPARATUS

BACKGROUND OF THE INVENTION

The present invention relates to straddle cranes for carrying heavy and awkwardly sized loads, and more particularly, to straddle cranes of the type including a vertical column member at each of four corners thereof, two side beam members connected between respective pairs of vertical column members and at least one header beam member, with wheel or caster assemblies supporting each of the vertical column members.

Because of the heavy loads and shocks which are applied to the structural members and joints in straddle cranes, it is necessary to design carefully the structures and joints of the crane to accommodate such loads and to prevent structural failure so that minimum structural deformation occurs in the straddle crane structure when loaded and operated. Preferred designs require careful consideration of the member cross-sectional configurations and the connection means used between the various members.

U.S. Pat. No. 3,251,433 to Hintze et al. discloses a straddle type vehicle having spaced side frames connected by U-shaped members, a structure which is representative of a number of prior straddle vehicle structures. As the demand for greater load carrying capacities has increased, the basic structures have been modified by the additional use of various types of cross-bracing structures to strengthen the vehicle. In the main, such structures have been satisfactory where the vehicle travels over relatively planar ground or on a fixed track. When, however, the vehicle is required to traverse uneven terrain, as in the field, additional structural attention must be paid to the stresses which occur as the vehicle "walks" over the irregular terrain.

U.S. Pat. Nos. 3,640,413 and 3,356,239 disclose the use of load supporting members for torsionally and rotationally supporting a load engaging and supporting structure. By way of example, such load supporting members have not, however, heretofore been utilized effectively to provide a solution to the aforementioned problem nor have such members been used to join at their opposed ends respective pairs of vertical columns on a straddle vehicle.

Thus, it has remained a problem in the art to provide a straddle vehicle which includes two pairs of load-bearing columns with steerable casters at the lower ends of each column with sufficient structural integrity to accommodate heavy loads over uneven terrain. Specifically, the side beam member must under static and irregular terrain travel conditions provide a sufficient torsional and bending resistance to support the downward and inward load applied to the vertical columns by the upper reeving to engage the load, as well as a power package for the vehicle and an operator's station. In addition, a header beam member must provide a sufficient buckling resistance while yet being sufficiently flexible to provide for movement of the vehicle over irregular terrain without producing unacceptable shear stresses in the member. Thus, a broad overall objective of this invention is to provide a straddle vehicle of the type described which possesses the aforementioned desirable characteristics.

It is also preferable that the operator station and controls in a straddle crane vehicle be designed to facilitate versatile use and control of the vehicle by a single manual operator. Often, the visual attention of the operator is fully occupied during maneuvers with the need to observe clearances to prevent collisions with obstacles close to the desired path of travel. Accordingly, the steering and driving controls provided to the operator must permit optimal vehicle control to be achieved while requiring minimum attention or inputs from the operator.

While the operator station and the power package for the vehicle may be suspended beneath the side in an integrated package, these items may also be separated. Thus the power package can be located above or below the side beams and the operator located on a suspended column which pivots to provide the operator full vision in the direction of travel. Alternatively, the operator may be located in a cab above the side to provide vision over large objects.

It is also preferable to provide straddle cranes of the type adaptable for two-wheel or four-wheel steering, with two-wheel or four-wheel driving, with one open end or both ends closed. The structure of the invention permits the design of an open-ended straddle vehicle which does not require a rotating joint on one side of the machine to provide for the flexibility required for uneven terrain. Moreover, the manufacturer and the user have the option of adding a second header member, preferably identical to the first, to close the open end for different straddle lifting operations.

Accordingly, it is an object of the invention to provide an improved straddle vehicle structure better adapted to accommodate heavy loads and forces experienced during maneuvering over uneven or irregular surfaces.

It is a further object of the invention to provide a basic straddle crane structure which is adaptable for use for two-wheel or four-wheel steering and two-wheel or four-wheel driving, and to have either one open end or both ends closed.

It is still a further object of the invention to provide improved means for attaching the header beam member to the vertical column members of a straddle crane to better accommodate the stresses and forces experienced by the straddle crane during maneuvers over uneven and irregular surfaces.

It is another object of this invention to provide, in combination with a straddle vehicle having two pairs of vertical load-bearing columns with a header beam member as described, hollow torsion members secured by gussets between respective pairs of columns to provide torsional and bending resistance to the vehicle during traverse of irregular terrain.

It is a still further object of the invention to provide for improved positioning of the operator station on a straddle crane to permit the operator to have better visibility during maneuvering of the vehicle.

These and other objects and advantages will become apparent from a review of the written description of the invention taken with the accompanying drawings.

SUMMARY OF THE INVENTION

Toward the fulfillment of these and other objects, a straddle crane vehicle having vertical column members at each of the four corners thereof is provided with two side beam members, one connected between the two vertical columns on the left side thereof and the other of which is connected between the two vertical columns on the right side thereof, and including at least one header beam connected between the upper portion of the vertical column members at the front and/or rear of the straddle crane. The header beam preferably has an open cross section with a small tubular center dimensioned to provide sufficient buckling resistance to permit movement of the vehicle over uneven terrain without producing unacceptable shear stresses. The outer flanges of the open portion of the header beam provide for bending resistance about the vertical and horizontal axes of the beam's cross section. Wheel or caster assemblies are provided at the base of each of the vertical column members and support the vertical column members. The wheel assemblies are adapted to be used with two-wheel or four-wheel steering and two-wheel or four-wheel driving.

The bending resistance of the header beam and the flanges have the advantages of providing a bending resistance about the vertical and horizontal axes of the cross section of the beam which cannot be obtained with a singular closed section of larger proportions without making the complete section too rigid torsionally and developing detrimental shear stress. Thus, the design according to the invention provides an open-ended straddle crane which does not require a rotating joint on one side of the machine to provide for the flexibility required for uneven terrain. Furthermore, the design allows the manufacturer the option of adding a second identical header member to close the open end for different straddle lifting operations.

An important feature of the invention relates to the joint design for the header beam to the column. Such a joint experiences many loads, such as a vertical shear, a torsional shear, being about both a vertical and a horizontal axis, and tension or compression. To overcome these loads, two plates may be bolted together tightly enough to establish a friction type connection. But, as the capacities of the machine increase, the number of fasteners around a joint become limited. Such shear is approximately equal to the tension in the critical fastener of the joint, it must develop enough tension to overcome the tensile force plus develop enough tension to sustain the friction required to prevent slippage. Assuming a coefficient of friction of 0.5, a fastener must develop three times the tension required for bending loads alone. Several alternative header beam connections are thus disclosed.

A side beam, or torsional beam, is used to connect each member of one pair of the vertical columns with a corresponding member of the other pair at the ends of the side beam. Preferably, gussets are used to secure the side beams to the vertical columns. Each side beam comprises a closed formed section or structural tubing section. A closed cross-sectional element is used to provide the torsional and bending resistance required to support the downward and inward load applied to the vertical columns by the reeving on the vertical columns.

DETAILED DESCRIPTION OF THE PREFERRED EMBODIMENTS

Figure 1:
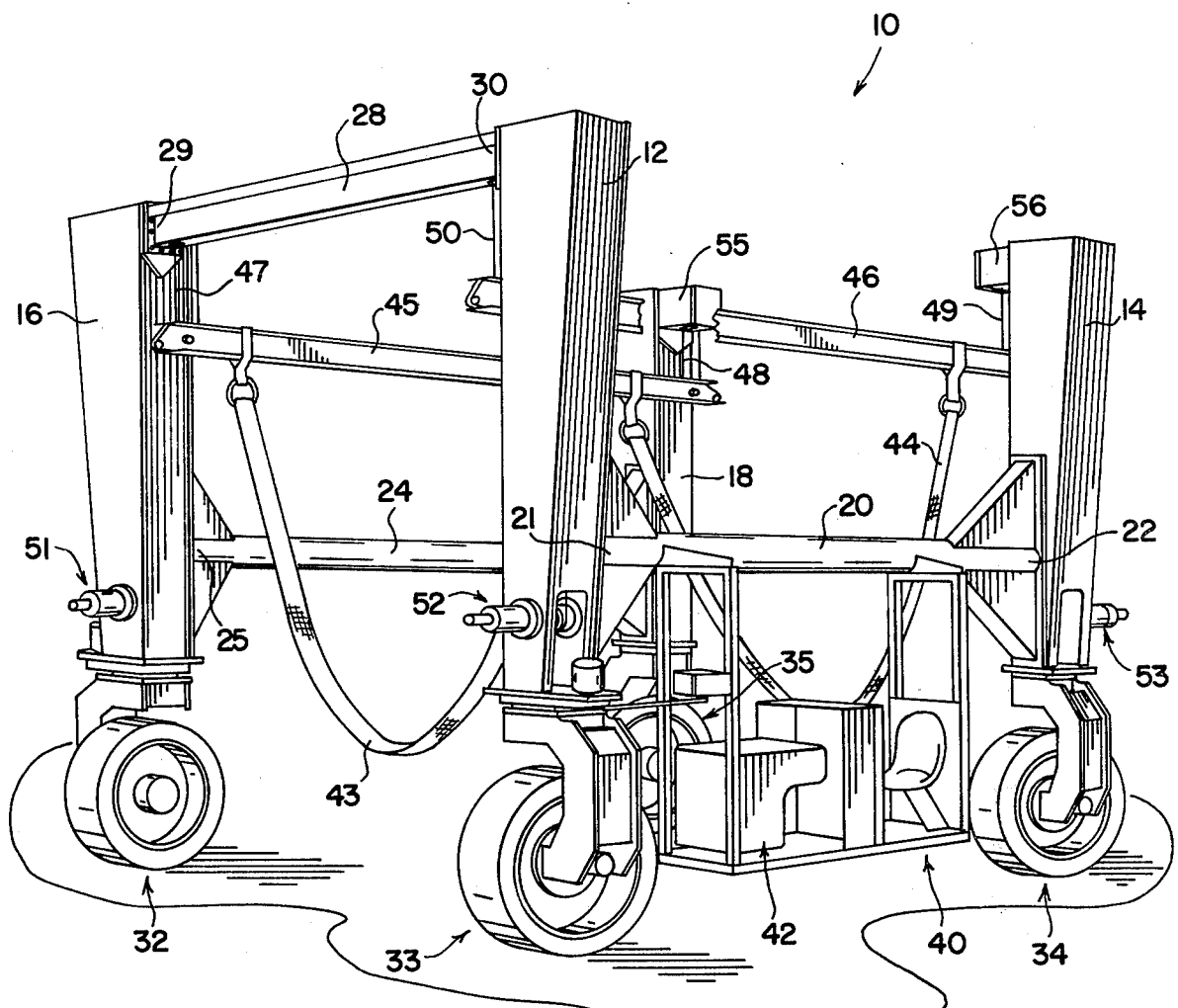
FIG. 1 is a perspective view of a straddle crane vehicle according to the present invention adapted for two-wheel steering, two-wheel driving and having an open end at the rear thereof.

As shown in FIG. 1, a straddle crane vehicle designated generally by the reference numeral 10 includes four vertical column members 12, 14, 16 and 18, one at each corner of the vehicle, each of which is supported, respectively, by a wheel or caster assembly designated respectively by the reference numerals 33, 34, 32 and 35. The straddle crane 10 also includes a single header beam 28 attached at its opposed ends 29 and 30 to the inside, upper portion of the vertical column members 16 and 12, respectively. Such a structure will be referred to as an open-ended vehicle. The addition of another header beam member between columns 14 and 18 will thus define a closed end straddle vehicle.

The straddle crane 10 also includes two side beam torsional members 20 and 24 connected between the two opposed vertical members on each side of the vehicle, and which are preferably circular in cross section as will be further described.

The end 21 of the side beam 20 is connected to the vertical member 12 and the end 22 of the beam 20 is connected to the vertical member 14. Similarly, the end 25 of the side beam 24 is connected to the vertical member 16 and the other end of the side beam 24 is connected to the vertical member 18. An operator station 40 is suspended partially beneath and partially laterally of the side beam member 20 on a platform which also includes a power source module 42.

The straddle crane 10 is also equipped with two slings 43 and 44 adapted to hold and carry heavy or awkwardly sized loads. One end of each of the slings 43 and 44 is connected to a first load beam member 45 and the other end of each of the slings 43 and 44 is connected to a second load beam member 46 as shown. The load beam 45 is suspended by cable means 47 and 48 from the left upper portion of the straddle crane 10, and the load beam 46 is similarly suspended by cable means 49 and 50 from the right upper portion of the straddle crane 10. Three cable reeling mechanisms 51, 52, 53 and a fourth cable reeling mechanism (not shown) associated respectively with the vertical columns 16, 12, 14 and 18 control the playout and reeving of the cables 47, 50, 49 and 48, thereby controlling the manner in which the load beams 45 and 46 are suspended from the upper portion of the straddle crane 10 as will be more fully described. The cables 47 and 50 exit from the upper portion of the header beam member 28. Similarly, the cables 48 and 49 exit, respectively, from suspension stations 55 and 56 as shown in FIG. 1.

Figure 2:
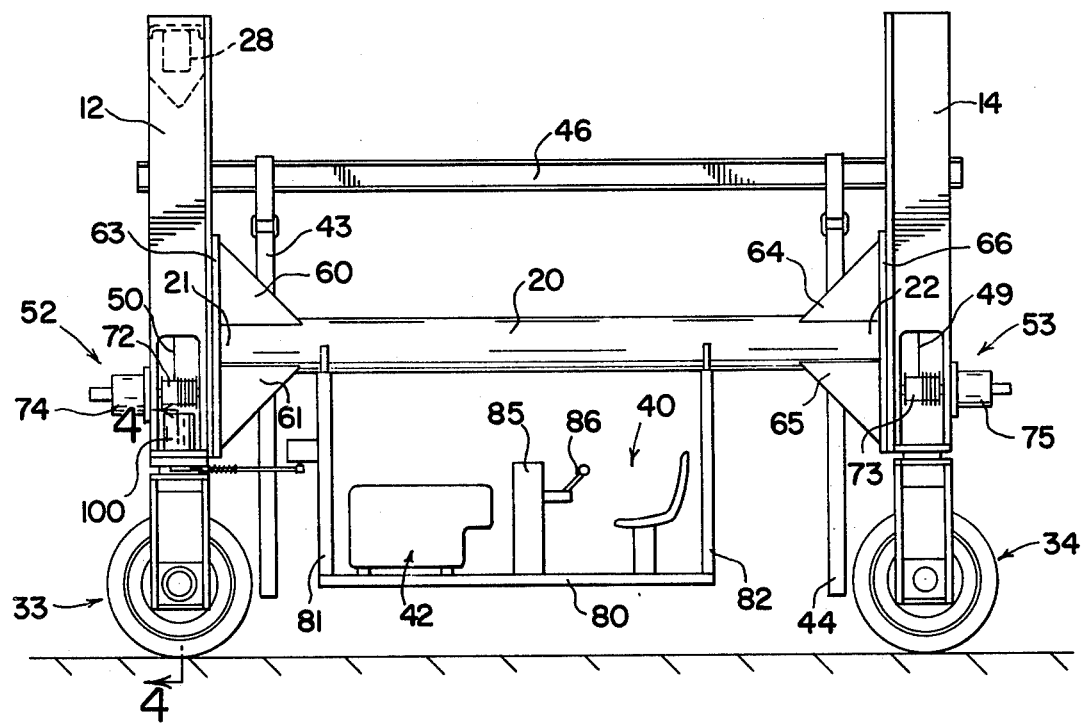
FIG. 2 is a left elevation of the straddle crane vehicle of FIG. 1 showing the power package and operator station on the vehicle.

As shown in FIG. 2, the operator station 40 and the power package module 42 are supported on a platform 80 which is suspended by vertical members 81 and 82 attached to the side beam torsional member 20. An operator console 85 is provided with an operator control 86, provided and positioned in front of the operator seat 40 in a convenient arrangement.

As is also shown in FIG. 2, upper and lower gusset plates 60 and 61 are attached to the end 21 of the side beam member 20. The two gusset plates 60 and 61 and the side beam member 20 are also all attached to an end plate 63 which, in turn, is fastened and attached to the vertical member 12 as shown. Similarly, upper and lower gusset plates 64 and 65 are attached to the end 22 of the side beam member 20. An end plate 66 is attached to the gusset plates 64 and 65 and also to the end 22 of the side beam member 20. The end plate member 66 is also attached to the vertical column member 14.

The cable reeling mechanisms 52 and 53 include reeling motors 74 and 75 which control the reeling of the cables 50 and 49 respectively, on cable reels 72 and 73. In a preferred embodiment, the reeling action of the reeling control motors 74 and 75 is controlled by control levers from the operator's station 40 so that the operator may appropriately adjust the suspension of the load beam member 46 and, in turn, the sling action of the load carrying slings 43 and 44.

A hydraulic steering motor 100 is also shown in FIG. 2 associated with the wheel assembly 33 supporting the vertical column member 12 and will be further described.

Figure 3:
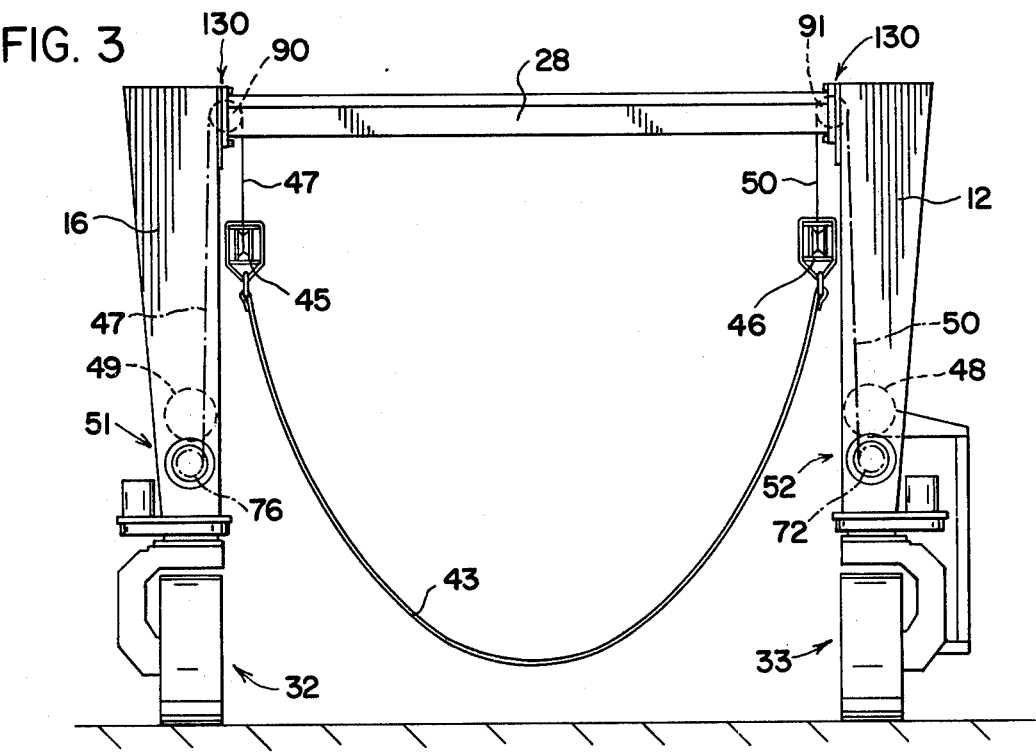
FIG. 3 is a front elevation of the straddle crane vehicle of FIG. 1 showing load beams and slings for lifting and the location of the side torsional beam about midway between the header beam and the ground elevations.

FIG. 3 is a front elevation showing load beams and basket slings for lifting. As is best seen in FIG. 3, the cable 47 attached to the load beam 45 is connected over a pulley means 90 at the upper portion of the vertical member 16. The cable 47 leaves the pulley 90 toward the load beam at a point partially extending outwardly of the vertical column member 16, and exits through an aperture in the lower portion of the header beam member 28 to its connection point on the beam 45. Extending in the other direction, the cable 47 extends about the pulley 90 and is confined to the interior portion of the vertical member 16 and is connected to and reeled about a reel means 76 associated with the cable reeling mechanism 51 previously described. Similarly, the cable means 50 is connected to the load beam 46 and passes over a pulley means 91 at the upper portion of the vertical member 12. The other portion of the cable means 50 is similarly confined within the vertical member 12 and is connected to and reeled on the reel means 72 associated with the cable reeling mechanism 52 previously described. It is further seen in this view that the sling member 43 is supported and connected at the ends thereof to the load means 45 and 46.

The numerals 130 denote, generally, the attachment means by which the header beam member 28 is connected to the vertical column members 12 and 16, alternative embodiments of which will be further described in detail with reference to FIGS. 5–7. The numerals 48, 49 illustrate the circular cross sections of the side beam members 20 and 24, respectively. In FIG. 3, the side beam or torsion members are shown approximately half way between the header beam 28 and the ground elevation.

Figure 4:
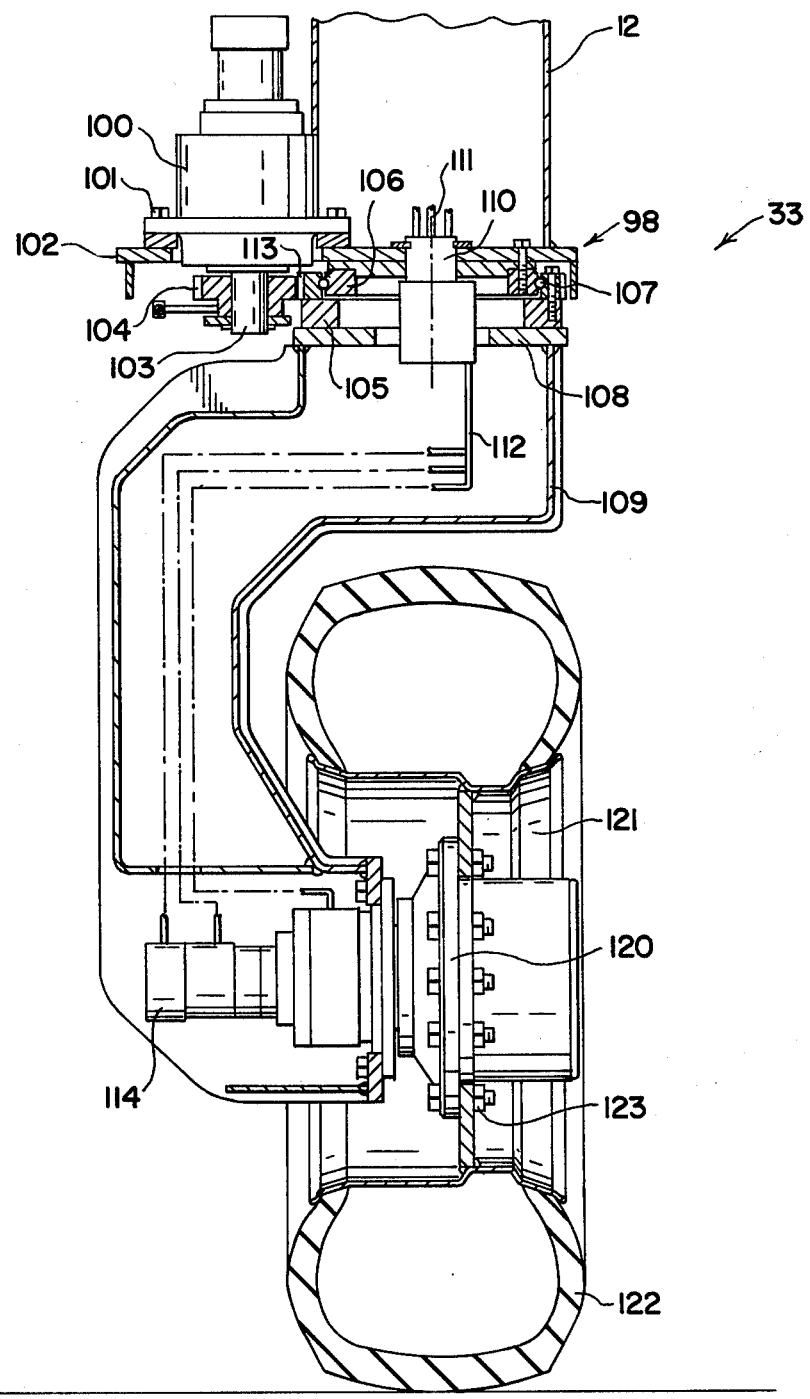
FIG. 4 is a sectional view of a wheel assembly taken along line 4—4 of FIG. 2 and illustrating hydraulic steering and driving means including a propelling and steerable caster, wherein a turntable bearing with external gear teeth engages a steering pinion.

FIG. 4 is a sectional view along line 4—4 of FIG. 2 further illustrating details of the wheel assembly 33, including the steering and driving means associated therewith and particularly a propelling and steerable caster. The other front wheel assembly 32 of the straddle crane 10 has similar structural details. The rear wheel assemblies 34 and 35 as shown in FIG. 1 are non-steerable and non-drivable assemblies. With appropriate modifications, however, the wheel assemblies 34 and 35 could be made steerable and/or driveable.

The hydraulic steering motor 100 is shown supported on and connected to a plate 102 by a fastening means 101. The plate 102 is attached to the lower portion of the vertical member 12 and supported on a turntable bearing apparatus designated generally by the reference numeral 98, which will be further described. The steering motor 100 has a central shaft member 103 which is keyed to a gear means 104 which is adapted to mesh and engage with external gear teeth means 113 associated with the turntable bearing apparatus 98. The gear teeth 113 are connected to a rotatable member 105 of the apparatus 98 and a plate 108 is attached to the lower portion of the member 105 as shown. The apparatus 98 also includes bearing means 107 engaging between the rotatable member 105 and an internal member 106 secured to plate 102. Wheel supporting means 109 are attached to the lower portion of the plate member 108.

The turntable bearing apparatus 98 includes a central aperture therethrough in which is included a rotatable hydraulic transfer means 110. A plurality of hydraulic lines 111 and 112 are connected to the respective sides of the transfer means 110. The hydraulic lines 112 are connected to a hydraulic driving motor 114 associated with the wheel assembly 33 as will be further described. By appropriate hydraulic signals being applied to the hydraulic lines 111 from hydraulic sources and control apparatus (not shown), hydraulic signals are applied through the lines 112 to the motor 114 to control the rotation of the hydraulic driving motor 114 mounted in the lower portion of the wheel supporting means 109. A wheel hub 120 is attached to a rotary member (not shown) of the motor 114 and the hub 120 is adapted to receive thereon a wheel 121 which may be fastened thereto by fastening means 123. The wheel 121 is adapted to have mounted thereon a suitable tire 122 as shown.

With appropriate hydraulic signals to the hydraulic steering motor 100 from hydraulic sources and control means (not shown), the turntable bearing apparatus 98 will cause the wheel assembly 33 to rotate relative to the vertical column member 12 through a predetermined steering angle, based on the hydraulic signals provided. By these means, steering of the wheel assembly 33 is effected.

Figure 5:
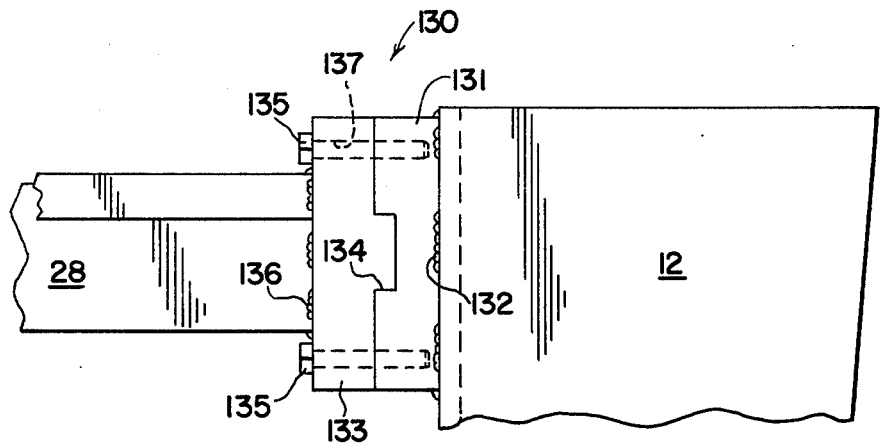
FIGS. 5, 6 and 7 are fragmentary, front elevations illustrating several alternative embodiments of means for attaching a header beam member to a vertical column member in a straddle vehicle according to the present invention.
Figure 6:
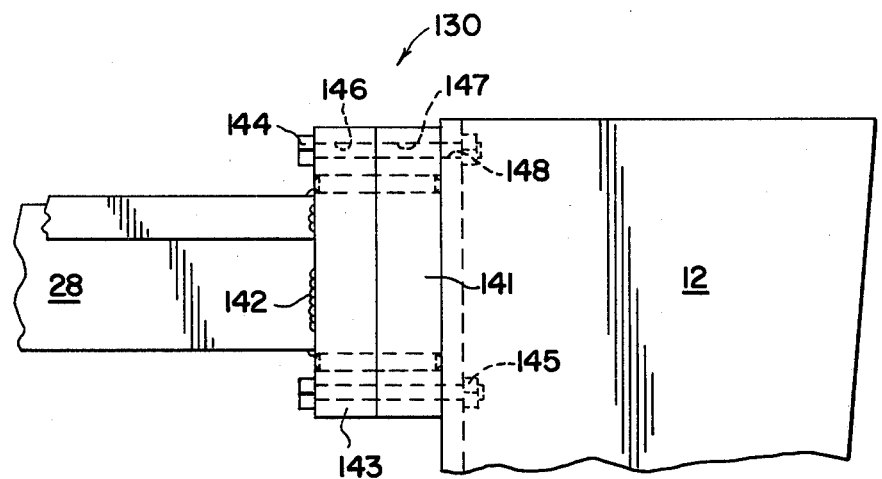
Figure 7:
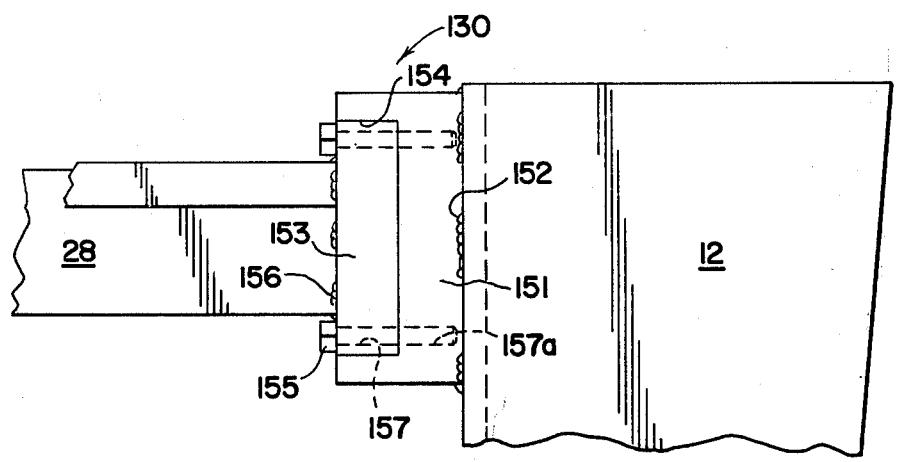

FIGS. 5–7 show further details of three alternative embodiments for the attachment means 130 for attaching one end of the header beam member 28 to the vertical column member 12. These attachment means 130 may, of course, be used for attachment of any header beam member to any vertical column member. It has been determined that it is very important to properly select an attachment means 130 well suited to accommodate the forces and stresses occurring at the connection point between a header beam and a vertical column in order to minimize bending and deformation of the straddle crane when under load. Normal friction type, bolted joints are impractical for larger capacity straddle cranes because such joints are not capable of adequately tolerating the stresses and forces.

FIG. 5 is a first embodiment of a connection means 130 for connecting the header beam member 28 to the vertical column member 12. A plate member 131 is welded by weldment 132 to an inside upper surface of the vertical column member 12. The plate member 131 preferably has a laterally extending horizontally aligned, guide or guideway 134 formed therein. A second plate member 133 has formed thereon an extension adapted to be matingly received in the recessed slot or guide 134 of the plate member 131. The plate 133 is attached to the end of the header beam 28 by weldment 136 as shown. Attachment of the beam 28 to the vertical column 12 is effected by placing the plate member 133 into mating engagement with the plate member 131. Threaded fasteners 135 are then inserted through bores 137 formed in the plate 133 and threaded into aligned blind openings 137 formed in the plate 131 as shown until secure attachment is achieved.

FIG. 6 illustrates an alternative embodiment of the attachment means 130. A first plate member 143 is welded by weldment 142 to one end of the header beam 28. The plate 143 has drilled or formed therein throughbores 146 as shown. A second plate or spacer plate 141 is provided and also has throughbores 147 formed therein. The bores 147 in the plate 141 are adapted to be aligned with the bores 146 of the plate 143. Similarly, throughbores 148 are drilled or formed through the inside upper wall of the vertical column member 12. The bores 148 are positioned appropriately for alignment with the throughbores 146 and 147 of the plates 141 and 143. To effect assembly of the joint 130 between the beam 28 and the vertical member 12, the three sets of throughbores 146, 147 and 148 are brought into alignment as shown and machine bolts 144 are inserted through the bores. Nut or fastener means 145 are then threaded onto the threaded ends of the machine bolts 144 to hold the assembly in place.

FIG. 7 illustrates a still further alternative embodiment for connection means 130 for fastening the header beam 28 to the vertical column member 12. A first plate member 153 is welded by weldment 156 to the end of the beam member 28 as shown. Throughbores 157 are drilled or formed through the outer periphery of the plate member 153. A second plate member 151, having an enlarged slot or recess 154 formed therein and adapted to matingly receive therein the plate member 153, is welded to the upper portion of a wall of the vertical member 12 by weldment 152. Blind holes 157a drilled or formed in the plate member 151 are positioned to allow alignment with the throughbores 157 of the plate member 153. To effect assembly of the joint, the plate member 153 is inserted into the enlarged slot or recess 154 of the plate member 151, the throughbores 157 are brought into alignment with the blind holes 157a and threaded fastening means 155 are inserted through the throughbores 157 and threaded into the blind holes 157a to provide secure attachment.

It has been found that the various connection and attachment means according to FIGS. 5-7 are well suited for absorbing and tolerating the forces and stresses which occur at the joints between the header beam members and the vertical column members during operation of straddle cranes according to the present invention with minimum bending and deformation of the structure. A straddle crane having a 38,000 pound capacity has been developed using such techniques. The header beam connection of FIGS. 5-7 are particularly suitable where a friction type bolted joint would be impractical for larger machines.

FIGS. 8-13 illustrate several alternative embodiments for the cross-sectional construction of the header beam member 28 of the straddle crane 10. These various embodiments are believed to provide beam structures best suited to absorb the various stresses and forces, including torsion forces, to which the header beam 28 is subjected during loading and operation of straddle cranes according to the present invention over uneven or irregular surfaces.

Figure 8:
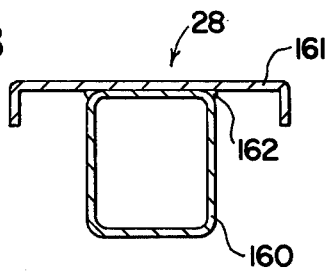
FIGS. 8, 9, 10, 11, 12 and 13 are cross-sectional views illustrating alternative embodiments of the header beam structural members suitable for use in a straddle crane according to the present invention and having closed areas proportioned to permit torsional deflection, sustain torsional shear stresses and maintain maximum machine rigidity.

A first embodiment as shown in FIG. 8 includes a box channel 160 welded by weldment 162 to the interior web of a C-channel member 161 so that the web of the member 161 is horizontally aligned.

Figure 9:
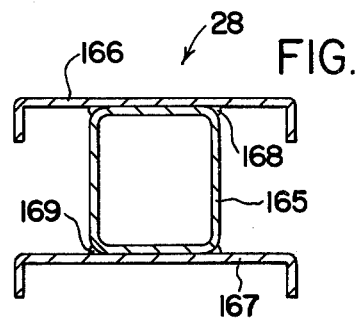

An alternative embodiment as shown in FIG. 9 includes a box channel 165 welded by weldment 168 on a first side thereof to the interior web of a C-channel 166. The side of the box channel 165 opposite the first side is similarly welded by weldment 169 to the exterior web of a C-channel 167. The webs of the two channels 166 and 167 are horizontally aligned and parallel to one another.

Figure 10:
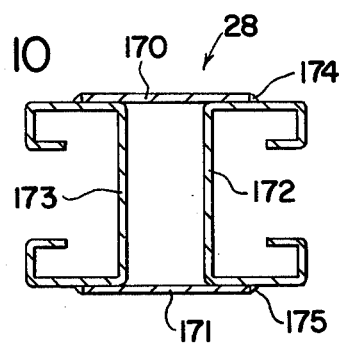

A further embodiment is shown in FIG. 10 in which upper and lower, horizontally aligned, parallel plates 170 and 171 are welded by weldments 174 and 175 respectively, to the exterior webs of two channel members 172 and 173, respectively. The channel members 172 and 173 are similar to C-channel members except that the outer portion of the members are formed and folded back toward the interior web of the channel members as shown. The principal webs of the members 172 and 173 are vertically aligned and parallel to one another.

Figure 11:
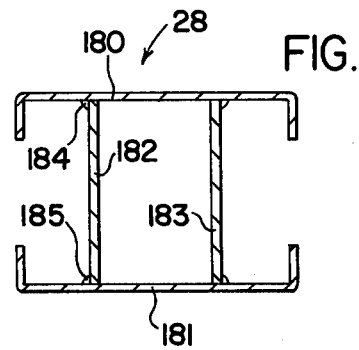

A further embodiment is shown in FIG. 11 in which two vertically aligned, parallel plate members 182 and 183 are welded, respectively, by weldments 184 and 185 to the interior webs of two C-channel members 180 and 181. The webs of the members 180 and 181 are horizontally aligned and parallel to one another.

Figure 12:
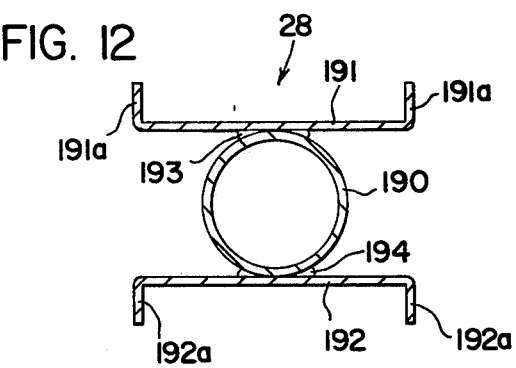

FIG. 12 shows a further alternative embodiment in which a circular tube member 190 is welded by weldments 193 and 194, respectively, to the exterior webs of two C-channel members 191 and 192 so that the webs of the two C-channel members 191 and 192 are horizontally aligned and parallel to one another. The flanges 191a of the member 191 is oppositely directed from that of the flanges 192a of the member 192.

Figure 13:
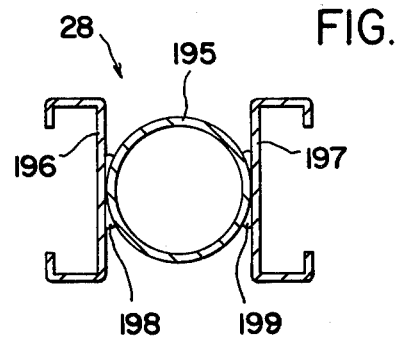

FIG. 13 shows a still further alternative embodiment in which a circular beam 195 is welded by weldments 198 and 199, respectively, to the principal exterior webs of channels 196 and 197, respectively. The principal webs of the channels of 196 and 197 are vertically aligned, parallel to one another. Each of the channels 196 and 197 is formed from a C-channel member with the exterior ends thereof folded or bent towards one another as shown.

Each of the header beams of FIGS. 8–13 is fabricated from structural or formed shapes to produce a beam which has an open cross section with a smaller tubular center. The tubular center is dimensioned to provide sufficient buckling resistance but at the same time is flexible enough to provide for movement of the straddle vehicle over uneven terrain without producing unacceptable shear stresses in the header beam member. The outer flanges of the open portion of the header beam (in any of FIGS. 8–13) provide for bending resistance about the vertical and horizontal axes of the cross section of the beam, which resistance cannot be obtained with a singular closed section of larger proportions without making the complete section too rigid torsionally and developing detrimental shear stresses. By this construction, it is thus possible to produce an open-ended straddle crane which does not require a rotating joint on one side of the machine to provide for the flexibility required for uneven terrain.

Figure 14:
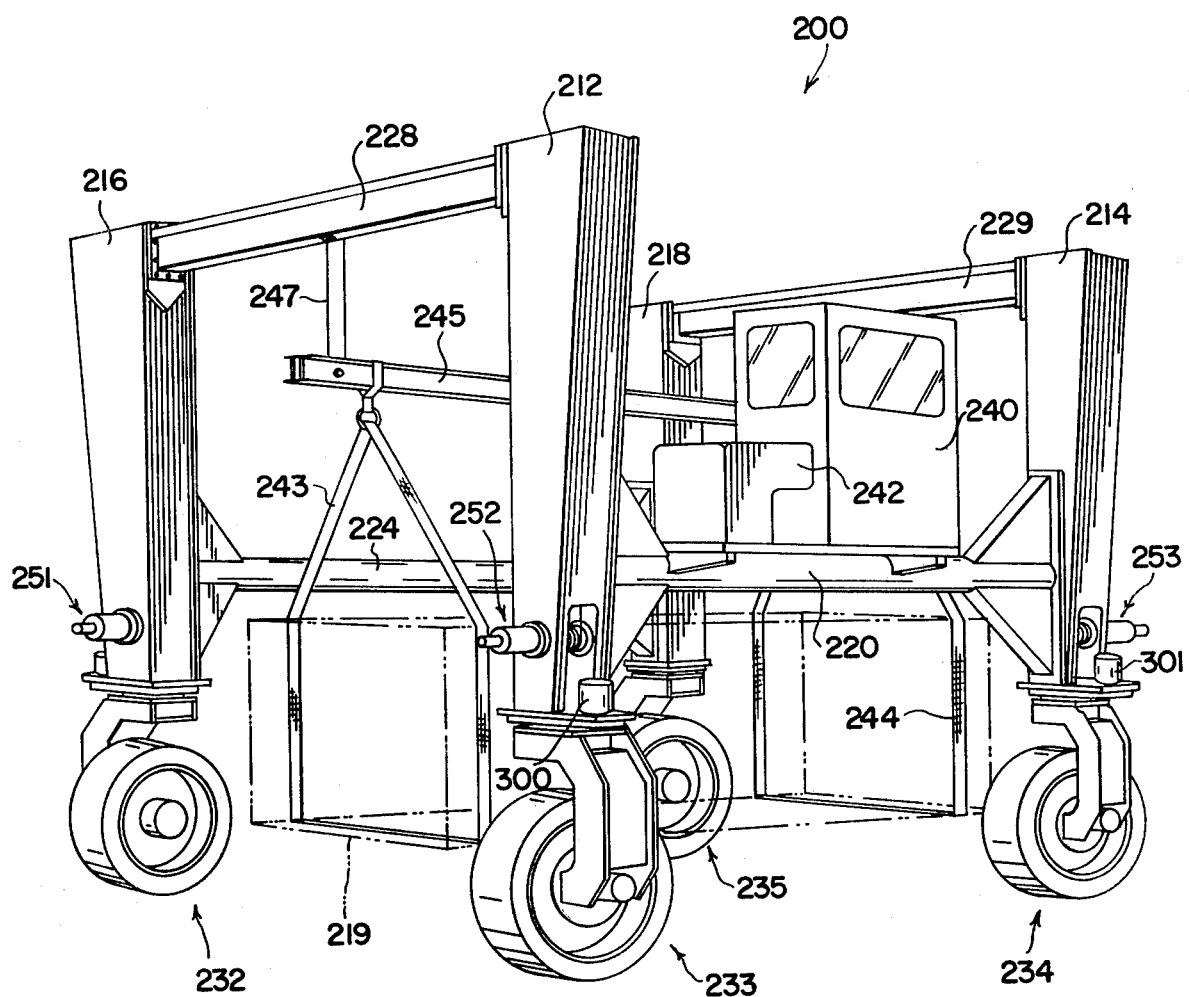
FIG. 14 is a perspective view of an alternative embodiment of a straddle crane according to the present invention having four-wheel steering and driving and having each end closed.

FIG. 14 shows an alternative embodiment for a straddle crane 200 according to the present invention. The numerals used to designate the elements in FIG. 14 correspond generally to the numerals used to designate like or similar elements of the straddle crane 10 of FIG. 1 except that the number 200 is added to the numerals of FIG. 1. Like designated elements in FIG. 14 perform functions similar to those previously described with reference to FIGS. 1 through 4 and will not be further described in detail, except to point out the principal differences of the straddle crane 200 as compared to the straddle crane 10.

The straddle crane vehicle 200 of FIG. 14 includes four vertical column members 212, 214, 216 and 218, one at each corner of the vehicle. The upper portions of the vertical column members 216 and 212 are connected together by a first header beam member 228. Similarly, the upper portions of the vertical columns 214 and 218 are connected together by a second header beam member 229. With this arrangement of header beam members, the straddle crane 200 is referred to as a "closed end" type straddle crane.

Four wheel assemblies 232, 233, 234 and 235 supporting, respectively, the vertical column members 216, 212, 214 and 218 are provided and each is a steerable and driveable wheel assembly such as the wheel assembly 33 of the straddle crane 10 previously described in detail with reference to FIG. 4. In particular, it is noted that the wheel assembly 234 includes a hydraulic steering motor 301.

In the straddle crane 200 as compared to the straddle crane 10, only a single load beam member 245 is used. A cable means 247 which exits through an aperture on the lower center portion of the header beam 228 is extended about a pulley (not shown) in the front end portion of the load beam 245. One end of the cable 247 is fixedly connected to the beam member 228 and the other end is connected to and controlled by a cable reeling mechanism 252 which performs cable reeling and unreeling functions substantially as previously described for element 52 of the straddle crane 10. Also, the load carrying strap members 243 and 244 are both connected to the single load beam 245 and are, therefore, configured differently than in the case of the straddle crane 10. The front load strap 243 is connected to the single load beam 245 at a single point and is adapted to carry, for example, a large, heavy load 219 as shown. Similarly, the strap member 244 is connected to the single load beam 245 at a point (not shown in FIG. 14) to support the rear portion of the load 219.

In the straddle crane 200, the operator's station or cab 240 is supported above and laterally of the side beam member 220 as shown. This arrangement results in improved visibility for the manual operator. The power package module 242 is also supported above the side beam member 220.

FIGS. 15–18 contain representations of certain of the forces, including torsion forces, operating on the various members and joints of the straddle crane 10 when loaded and/or operating over uneven or irregular surfaces. These FIGS. 15–18 further emphasize the importance of selection of the cross-sectional configurations of the various structural members and the connection means therebetween.

Figure 15:
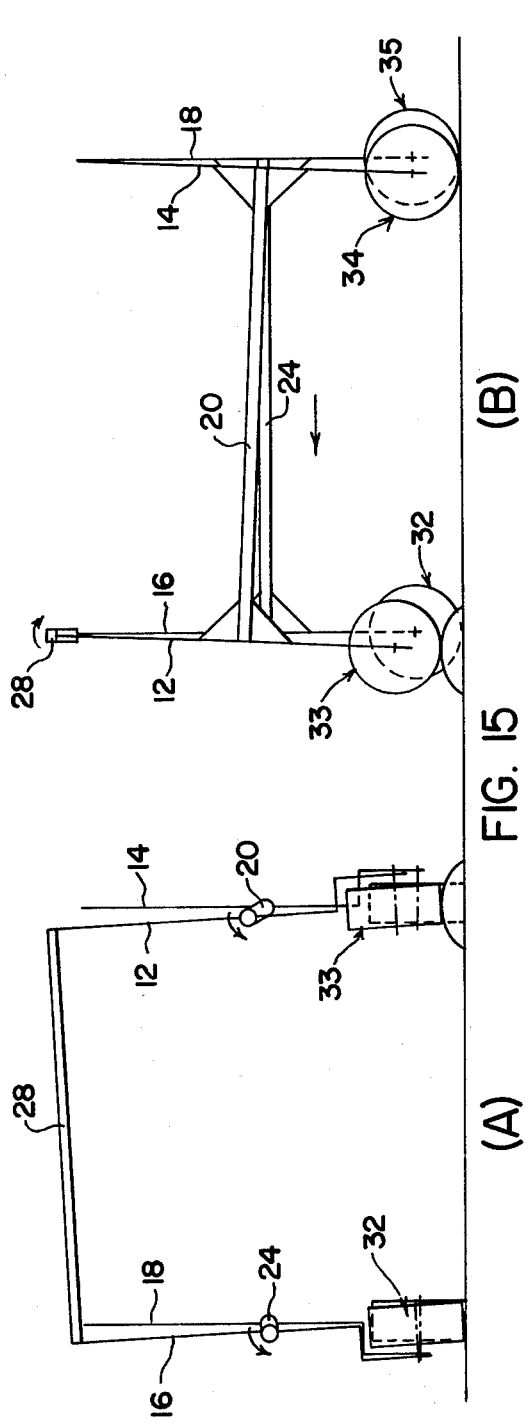
FIGS. 15A and B, 16A and B, 17A and B, and 18A and B contain drawings representing the loadings, stresses, and forces applied to the header beam member and side beam torsional members of a straddle crane according to the present invention when travelling over uneven or irregular surfaces.

As shown in FIG. 15, one of the front wheels of the straddle crane vehicle 10 is shown descending on an uneven surface. The front elevation of FIG. 15A illustrates that as a result thereof, increased torsion forces are applied to the side beam members 20, 24 as shown by the arrows. Similarly, FIG. 15B illustrates, by the arrows therein, the clockwise torsion forces applied to the header beam member 28 as a result of the same movement of the vehicle.

Figure 16:
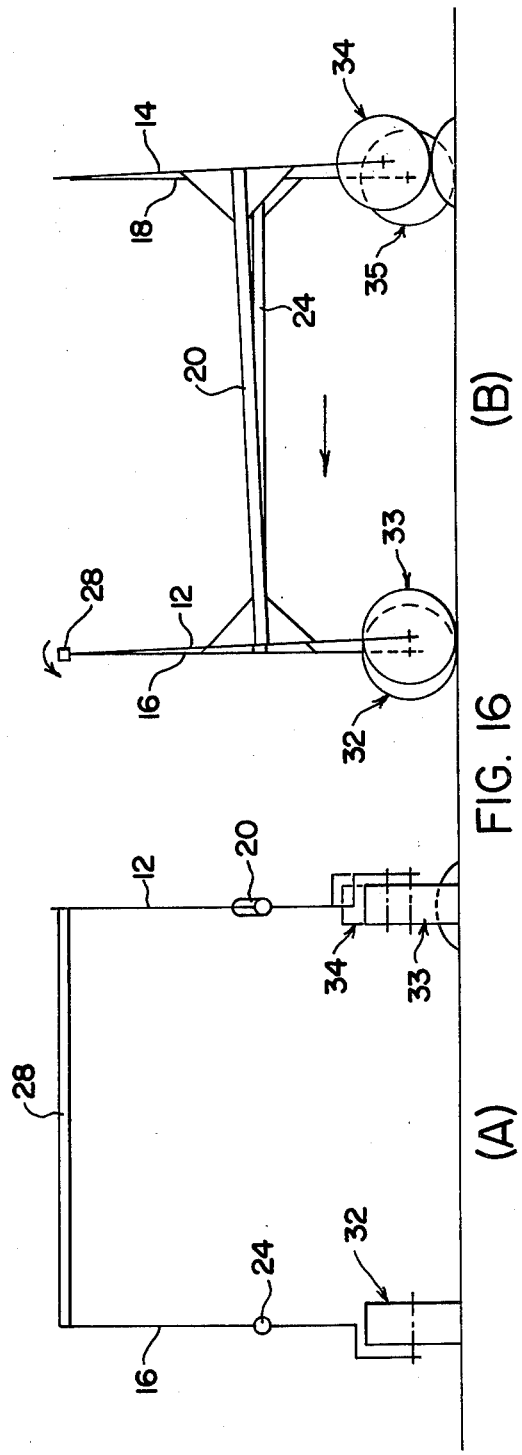

FIG. 16 further illustrates the corresponding torsion force effects applied to the crane vehicle 10 when a rear wheel thereof ascends an uneven surface. FIG. 16, accordingly, is comparable to FIG. 15, except that the torsion force effects on the members 20, 24 and 28 are oppositely directed as compared to FIG. 15.

FIG. 17 is a still further diagram which illustrates torsion forces applied to the various structural members of the straddle crane 10 when the wheels thereof traverse an uneven surface such as shown. The uneven surface tends to cause the structural members to bend, and the joints therebetween to be subjected to various torsion forces and other forces as well.

FIG. 18 is a still further diagram which shows the structural members of the straddle crane being subjected to bending forces as a result of the carrying of a heavy load supported by the strap members. From the front elevation of FIG. 18A it is seen that the side beam members 20, 24 are subjected to oppositely directed torsion forces as a result of the load.

These representations in FIGS. 15–18 further emphasize the importance of joint and member selection as previously described. In general, the torsional resistance of a member will induce bending in the adjoining member. The bending is minimized by choosing the smallest closed section possible for the header beam. Allowing the member to act torsionally allows for efficient use of the complete cross section, thereby reducing overall machine weight.

Accordingly, it is seen that straddle cranes according to the present invention achieve the above-described objects as well as other objects which will be apparent to those skilled in the art. It will further be apparent to those skilled in the art that various modifications and changes may be made to the present invention without departing from the scope of the invention as defined in the appended claims.

What is claimed is:

1. In a multi-wheeled straddle vehicle having two pairs of load bearing columns with casters at the lower ends thereof, the improvement comprising:

a torsion member having a cross section defining a closed geometric figure connecting each member of one pair of columns with a corresponding member of the other pair of columns by means of gussets at each end of said torsion member, the structure and size of said torsion member providing sufficient torsional and bending resistance to support downward and inward loads applied to said load bearing columns; and a header beam member having an open cross section and a tubular center, said header beam member being sized and dimensioned to provide sufficient buckling resistance and being sufficiently flexible to provide for movement of the casters over and in contact with uneven terrain without producing unacceptable shear stresses in said header beam member, said header beam member connecting the members of one pair of load bearing columns at an upper portion thereof.

2. The vehicle as set forth in claim 1 further including a second header beam member having an open cross section and a tubular center, said second header beam member being sized and dimensioned to provide sufficient buckling resistance and being sufficiently flexible to provide for movement of the casters over and in contact with uneven terrain without producing unacceptable shear stresses in said second header beam, said second header beam member connecting the members of the other pair of load bearing columns at an upper portion thereof to define a closed end vehicle.

3. The vehicle as set forth in claim 1 wherein the open cross section of said header beam member includes flanges to provide for bending resistance about the vertical and horizontal axis of the cross section of the header beam member.

4. The vehicle as set forth in claim 1 further including joint means for connecting said header beam to one of said load bearing columns, said joint means including a first plate secured by welding to said vertical column member and a second plate secured by welding to said header beam member, each of said first plate and said second plate defining a bore, and fastening means joining said first plate and said second plate to a friction joint.

5. The vehicle as set forth in claim 4 wherein one plate defines a recess and the other plate defines a projection, said projection mating with said recess when said first plate and said second plate are joined by said fastening means.

6. The vehicle as set forth in claim 4 wherein said column includes a throughbore in register with throughbores in the first plate and the second plate so that said fastening means further joins said column member.

7. The vehicle as set forth in claim 1 wherein the header beam member comprises a box channel member defining its tubular center secured to an intermediate portion of the interior web of a C-channel member defining its open cross section.

8. The vehicle as set forth in claim 7 wherein said header member further includes a second C-channel member secured to the side of the box channel member opposite the C-channel member, the combination defining its open cross section.

9. The vehicle as set forth in claim 1 wherein the header beam member comprises a first C-channel member and a second C-channel member and a pair of parallel plates spacedly securing the first channel member to the second channel member to define a tubular center which is defined by a portion of each of the C-channel members and said pair of plates.

10. The vehicle as set forth in claim 9 wherein said plates are connected between the exterior flanges of said C-channel members.

11. The vehicle as set forth in claim 9 wherein said plates are connected between the interior webs of said C-channel members.

12. The vehicles as set forth in claim 10 wherein each of said C-channel members further includes inwardly protruding lugs inwardly protruding toward the tubular portion of said header beam member.

13. The header beam as set forth in claim 1 wherein said header beam member is defined by a hollow tubular member secured at the opposed sides thereof to C-channel members having outwardly extending lugs to define the open portion thereof.

14. The header beam as set forth in claim 13 wherein said C-channel members have inwardly turned flanges extending therefrom.

15. The vehicle as set forth in claim 1 further including an operator station and a power package suspended from the torsion member beneath the side of said crane.

16. The vehicle as set forth in claim 1 wherein said operator station is suspended beneath said header member in the upper portion of said load bearing columns to provide the operator full vision in the direction of travel.

17. In a multi-wheeled straddle vehicle comprising:

two pairs of load bearing columns with casters at the lower ends thereof;

at least one header beam member defining an open cross section with a smaller tubular center, said open cross section including flanges to provide for bending resistance about the vertical and horizontal axis of the cross section of the beam, said tubular center dimensioned to provide sufficient buckling resistance with sufficient flexibility to provide for movement of the straddle vehicle over uneven terrain without producing unacceptable shear stresses in said header beam member;

joint means for securing said header beam member between one pair of load bearing columns at an upper portion thereof, said joint means comprising a pair of plates, one secured to the header beam, the other secured to the vertical column, and fastening means for securing said plates one to the other to provide a friction-type connection; and a torsion member connecting each member of one pair with a corresponding member of the other pair of vertical columns, the structure and size of the torsion member providing sufficient torsional and bending resistance to support downward and inward loads applied to said load bearing columns.

18. The vehicle as set forth in claim 17 further including gusset plates secured to said column and to said torsion member.

19. The vehicle as set forth in claim 18 wherein said torsion member is secured to said columns at a point approximately midway between said header beam member and ground level.

20. The vehicle as set forth in claim 17 further including means for steering and means for driving each of said wheels.

21. The vehicle as set forth in claim 17 including means for steering and means for driving a pair of said wheels.

22. The vehicle as set forth in claim 17 further including a first plate secured by welding to said vertical column member and a second plate secured by welding to said header beam member, each of said first plate and said second plate defining a bore, and fastening means joining said first plate and said second plate to a friction joint.

23. The vehicle as set forth in claim 22 wherein one plate defines a recess and the other plate defines a projection, said projection mating with said recess when said first plate and said second plate are joined by said fastening means.

24. The vehicle as set forth in claim 22 wherein said column includes a throughbore in register with throughbores in the first plate and the second plate so that said fastening means further joins said column member.

25. In a multi-wheel straddle vehicle of the type comprising two pairs of load bearing columns with casters at the lower ends thereof, a header beam connecting the members of one pair of load bearing columns at an upper portion thereof and a structural member connecting each member of one pair with a corresponding member of the other pair of vertical columns, the improvement comprising a header beam having an open cross section and a smaller tubular center, said open cross section dimensioned to provide sufficient buckling resistance to permit movement of the vehicle over uneven terrain without producing unacceptable shear stresses, the outer flanges of the open portion of the header beam providing for bending resistance about the vertical and horizontal axis of the beams cross section, the tubular center dimensioned to provide sufficient buckling resistance and flexibility to permit operation of the vehicle over uneven terrain.

26. The vehicle as set forth in claim 25 wherein the header beam member comprises a box channel member defining its tubular center secured to an intermediate portion of the interior web of a C-channel member defining its open cross section.

27. The vehicle as set forth in claim 26 wherein said header member further includes a second C-channel member secured to the side of the box channel member opposite the C-channel member, the combination defining its open cross section.

28. The vehicle as set forth in claim 25 wherein the header beam member comprises a first C-channel member and a second C-channel member and a pair of parallel plates spacedly securing the first channel member to the second channel member to define a tubular center which is defined by a portion of each of the C-channel members and said pair of plates.

29. The vehicle as set forth in claim 28 wherein said plates are connected between the exterior flanges of said C-channel members.

30. The vehicle as set forth in claim 28 wherein said plates are connected between the interior webs of said C-channel members.

31. The vehicle as set forth in claim 29 wherein each of said C-channel members further includes inwardly protruding lugs inwardly protruding toward the tubular portion of said header beam member.

32. The apparatus as set forth in claim 25 further including joint means for securing said header beam to said vertical column, said joint means including a first plate secured to said first vertical column, said second plate secured to said header beam, said first plate and said second plate being secured to each other by fastening members to develop sufficient frictional engagement therebetween to develop sufficient tension to overcome the tensile force on said joint plus sufficient tension to sustain friction required to prevent slippage.

33. A method for constructing a multi-wheeled straddle vehicle having two pairs of load bearing columns with casters at the lower ends thereof to permit said vehicle to move over and in contact with uneven terrain, comprising the steps of:
connecting a header beam member, having an open cross section and sized and dimensioned to provide sufficient buckling resistance and being sufficiently flexible to provide for movement of the casters over and in contact with the uneven terrain without producing unacceptable shear stresses in said header beam member, between the members of one pair of load bearing columns at an upper portion thereof; and
connecting a torsion member having a closed cross section and defining a closed geometric figure between each member of one pair with a corresponding member of the other pair of columns, the structure and size of said torsion member providing sufficient torsional and bending resistance to support downward and inward loads provided to said load bearing columns.

34. The method as set forth in claim 33 further including the step of connecting said header beam to said column by means of plates respectively secured to said column and said header beam, and fastening said plates one to the other to develop sufficient friction therebetween.

* * * * *